(12) United States Patent
Pan

(10) Patent No.: US 7,995,310 B1
(45) Date of Patent: Aug. 9, 2011

(54) HEAD-GIMBAL ASSEMBLY INCLUDING A FLEXURE TONGUE WITH ADHESIVE RECEPTACLES DISPOSED ADJACENT TO STAND-OFFS

(75) Inventor: Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 917 days.

(21) Appl. No.: 11/595,526

(22) Filed: Nov. 9, 2006

(51) Int. Cl.
*G11B 21/21* (2006.01)

(52) U.S. Cl. .................................. 360/234.6; 360/245.3

(58) Field of Classification Search ............... 360/234.6, 360/245.3, 245.4, 245.5
See application file for complete search history.

(56) References Cited

U.S. PATENT DOCUMENTS

| | | | |
|---|---|---|---|
| 4,700,250 A | 10/1987 | Kuriyama | |
| 5,027,238 A | 6/1991 | Konishi et al. | |
| 5,467,236 A | 11/1995 | Hatanai et al. | |
| 5,711,063 A | 1/1998 | Budde et al. | |
| 5,781,379 A | 7/1998 | Erpelding et al. | |
| 5,786,961 A | 7/1998 | Goss | |
| 5,880,908 A | 3/1999 | Shiraishi et al. | |
| 5,896,248 A | 4/1999 | Hanrahan et al. | |
| 5,956,209 A | 9/1999 | Shum | |
| 6,078,472 A | 6/2000 | Mitoh et al. | |
| 6,125,014 A | 9/2000 | Riedlin, Jr. | |
| 6,282,063 B1 | 8/2001 | Coon | |
| 6,313,972 B1 | 11/2001 | Williams et al. | |
| 6,349,017 B1 | 2/2002 | Schott | |
| 6,351,354 B1 | 2/2002 | Bonin | |
| 6,459,549 B1 | 10/2002 | Tsuchiya et al. | |
| 6,552,875 B1 | 4/2003 | Le et al. | |
| 6,741,426 B2 | 5/2004 | Girard | |
| 6,788,498 B1 * | 9/2004 | Bjorstrom et al. | 360/245.6 |
| 6,801,398 B1 * | 10/2004 | Ohwe et al. | 360/234.6 |
| 6,920,014 B2 | 7/2005 | Sato et al. | |
| 6,920,019 B2 | 7/2005 | Martin et al. | |
| 6,947,258 B1 | 9/2005 | Li | |
| 6,950,288 B2 | 9/2005 | Yao et al. | |
| 6,965,499 B1 * | 11/2005 | Zhang et al. | 360/234.8 |
| 7,002,780 B2 | 2/2006 | Rancour et al. | |
| 7,006,330 B1 | 2/2006 | Subrahmanyam et al. | |
| 7,095,590 B2 | 8/2006 | Motonishi et al. | |
| 7,474,508 B1 | 1/2009 | Li et al. | |
| 7,688,553 B1 * | 3/2010 | Williams et al. | 360/245.3 |
| 7,729,089 B1 | 6/2010 | Hogan | |
| 2001/0053050 A1 | 12/2001 | Crane et al. | |
| 2004/0070880 A1 | 4/2004 | Fu et al. | |
| 2004/0075946 A1 * | 4/2004 | Motonishi et al. | 360/234.6 |
| 2005/0078416 A1 | 4/2005 | Shiraishi et al. | |
| 2006/0203389 A1 | 9/2006 | Motonishi | |

FOREIGN PATENT DOCUMENTS

| | | |
|---|---|---|
| JP | 61-160823 | 7/1986 |
| JP | 05-128771 | 5/1993 |
| JP | 05-144207 | 6/1993 |
| JP | 07-169224 | 7/1995 |
| JP | 2000-123515 | 4/2000 |
| JP | 2001-043647 | 2/2001 |
| JP | 2006-252657 A | 9/2006 |

* cited by examiner

*Primary Examiner* — Craig A. Renner

(57) ABSTRACT

A head-gimbal assembly (HGA) is disclosed. The HGA comprises a slider, a flexure that includes a tongue, and an adhesive material bonding the slider to the tongue. The tongue includes a plurality of stand-offs that contact the slider, and a plurality of adhesive receptacles. Each of the plurality of adhesive receptacles is disposed adjacent to a corresponding one of the plurality of stand-offs. At least a portion of each of the plurality of adhesive receptacles is disposed between the adhesive material and a corresponding one of the plurality of stand-offs.

13 Claims, 3 Drawing Sheets

HEAD-GIMBAL ASSEMBLY INCLUDING A FLEXURE TONGUE WITH ADHESIVE RECEPTACLES DISPOSED ADJACENT TO STAND-OFFS

FIELD OF THE INVENTION

The present invention relates generally to information storage devices, and in particular to stand-offs on flexure tongues of head-gimbal assemblies.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The head stack assembly typically includes an actuator, at least one head gimbal assembly (HGA), and a flex cable assembly. During operation of the disk drive, the actuator must rotate to position the HGAs adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface. The microscopic spacing between the read or write transducer, and the surface of an adjacent rotating disk media during operation, is typically referred to as the so-called "flying height" of the head. The flying height is typically an important parameter upon which device performance depends, and so variation of the flying height in response to changes in operating and environmental conditions is typically undesirable.

The HGA includes a flexure that includes a tongue to which the slider is adhered. The adhesive cures after the slider is aligned within close proximity to the tongue. During this alignment, the adhesive can be in a liquid form and be compressed or otherwise distorted by the relative movement of the slider and the tongue. The tongue often includes stand-offs (e.g. having a known height equal to a flexure layer thickness) that the slider rests upon, so as to determine and maintain the spacing between the slider and the tongue. Control of this spacing can be desirable, for example, to ensure parallelism between the slider and the tongue, and/or to maintain a desirable vertical position of electrically conductive bonding pads on the slider relative to electrically conductive traces on the flexure. However, if some adhesive gets inadvertently displaced, for example during alignment due to the relative movement of the slider and the tongue, or because of other forces acting upon the adhesive (e.g. surface energy or gravity), so as to lie upon one or more of the stand-offs, then the parallelism and/or vertical position of the slider relative to the tongue can be disturbed. In that case, the pitch static attitude (PSA) and/or roll static attitude (RSA) of the slider can be affected, leading to a change in flying height during disk drive operation after assembly. If some adhesive often gets inadvertently displaced so as to lie upon on or more of the stand-offs during the manufacturing process, then flying height variation within a population of HGAs can be undesirably increased.

Thus, there is a need in the art for an improved flexure design that reduces the likelihood that the process by which the slider is bonded to the tongue will increase static attitude variation within a population of HGAs.

SUMMARY

A head-gimbal assembly (HGA) is disclosed. The HGA comprises a slider, a flexure that includes a tongue, and an adhesive material bonding the slider to the tongue. The tongue includes a plurality of stand-offs that contact the slider, and a plurality of adhesive receptacles. Each of the plurality of adhesive receptacles is disposed adjacent to a corresponding one of the plurality of stand-offs. At least a portion of each of the plurality of adhesive receptacles is disposed between the adhesive material and a corresponding one of the plurality of stand-offs.

DESCRIPTION OF THE PREFERRED EMBODIMENTS

Figure 1:
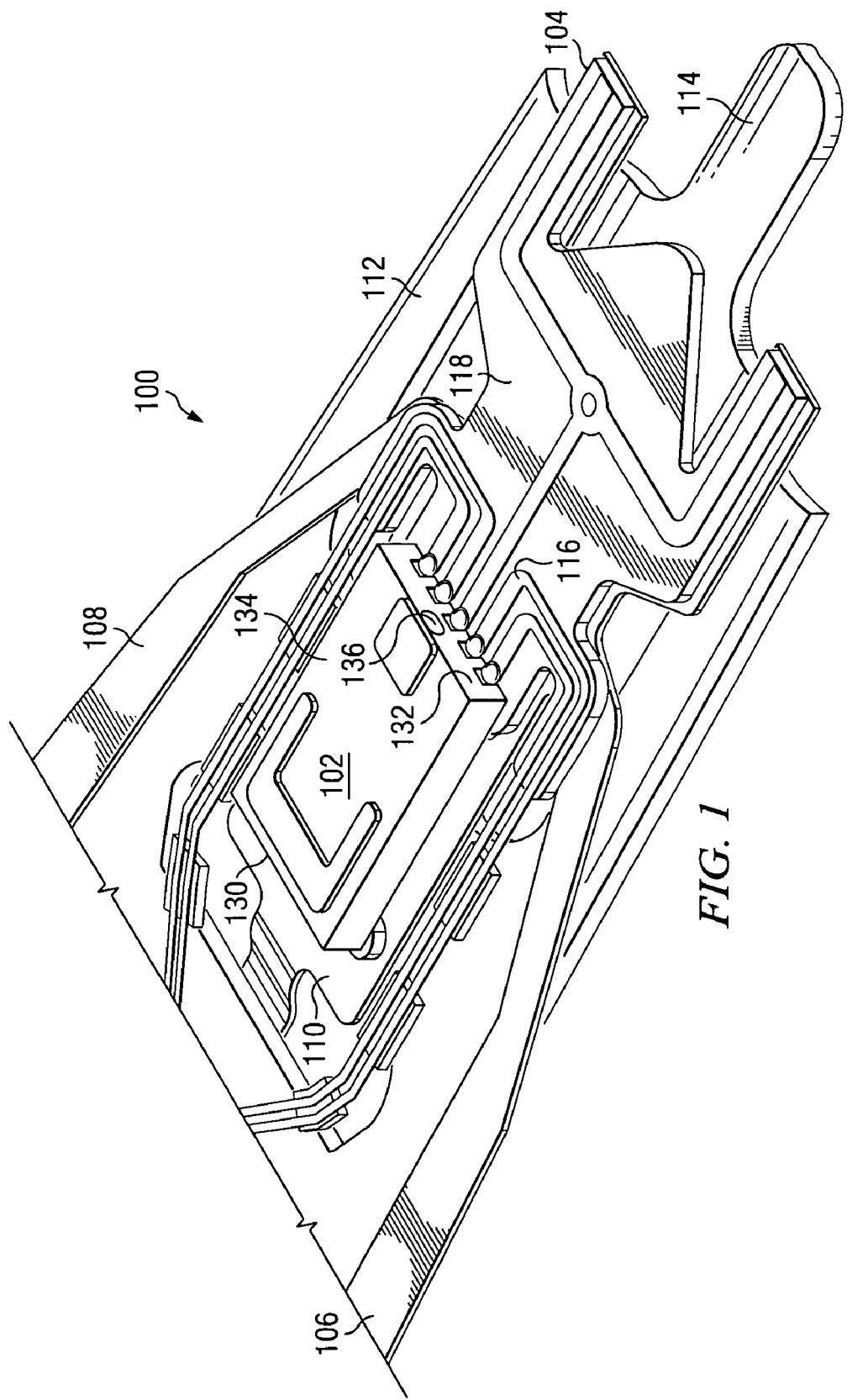
FIG. 1 depicts a head gimbal assembly (HGA) according to an embodiment of the present invention.
Figure 2:
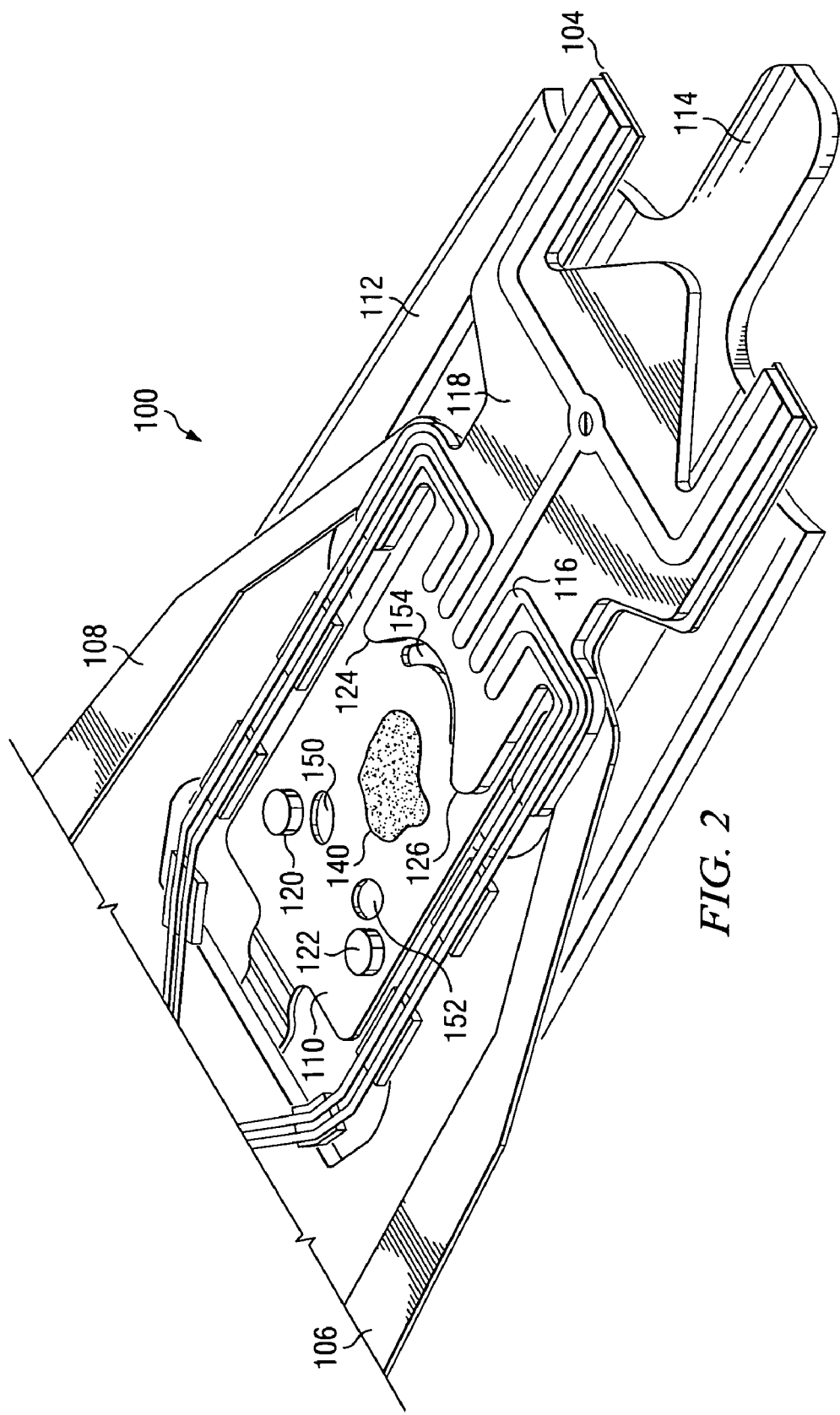
FIG. 2 depicts the HGA of FIG. 1 except with the head removed.

FIGS. 1 and 2 depict a head-gimbal assembly (HGA) 100 according to an exemplary embodiment of the present invention. HGA 100 includes a head 102 that is comprised of a slider 134 and a transducer 136. The slider is typically cut from a ceramic wafer, for example from an alumina titanium carbide wafer, and has a leading end 130 and a trailing end 132. The transducer 136 is disposed at the trailing end 132. For example, the transducer 136 may include a magnetic writer of a longitudinal or perpendicular design, and a read transducer that might be inductive or magnetoresistive, and/ or the transducer might read or write by optical means. The distance between leading end 130 and a trailing end 132 defines the slider length.

HGA 100 also includes a load beam 112 that provides lateral stiffness and a vertical preload to the structure of HGA 100. The load beam 112 may be fabricated from stainless steel, and may include a lift tab 114 for loading (or unloading) the head 102 onto (or away from) a surface of the data storage media. In magnetic disk drive applications, the data storage media could be a spinning hard magnetic disk, for example.

HGA 100 also includes a flexure 104. The flexure 104 includes a tongue 110 to which the head 102 is adhered, and two outrigger beams 106, 108 that provide flexibility to allow the tongue 110 to pitch and roll without excessive associated torques. The tongue 110, and the outrigger beams 106 and 108, may be fabricated from a stainless steel layer of the flexure 104.

The flexure 104 also includes electrically conductive traces 116 that may be fabricated from a conductive layer of the flexure 104 via a subtractive process such as etching. Alternatively, the electrically conductive traces 116 may be fabricated via an additive process such as deposition of a conductive layer onto the flexure 104. The conductive layer may comprise copper, for example.

HGA 100 also includes an adhesive material 140 that bonds the slider 134 to the tongue 110. The adhesive material 140 may comprise an epoxy material and may include a conductivity-enhancing dopant such as a silver dopant. Alternatively, the adhesive material 140 may comprise a cyanoacrylate material, for example. Curing of the adhesive material may be initiated or accelerated by ultraviolet light, in which case the adhesive material may be considered sensitive to ultraviolet light before it is completely cured.

In the embodiment of FIG. 2, the tongue 110 includes a plurality of discrete stand-offs 120, 122 adjacent the leading end 130 of the slider, and a plurality of stand-off regions 124, 126 of a dielectric layer 118, adjacent the trailing end 132 of the slider. The stand-offs 120, 122, 124, and 126 are in contact with the slider 134 after the slider bonding process is complete. Although two discrete stand-offs and two stand-off regions are shown in FIG. 2, other stand-off arrangements are contemplated and may be used. For example, stand-off regions 124, 126 may be replaced by additional discrete stand-offs, or a single discrete stand-off or stand-off region, and/or discrete stand-offs 120, 122 may be replaced by one or more discrete stand-offs or stand-off regions.

In certain embodiments, the stand-offs 120, 122, 124, and 126 are fabricated via a subtractive process from dielectric and conductive layers of the flexure 104. For example, the stand-offs 120, 122, 124, and 126 may be fabricated from a dielectric polyimide layer 118 of flexure 104, or may include material from both a polyimide layer and a copper layer. In such embodiments, the height of the stand-offs 120, 122, 124, and 126 would be determined by the thicknesses of the corresponding layers of flexure 104. For example, the flexure 104 may employ a dielectric layer thickness in the range 4-15 microns, and may employ a conductive layer thickness in the range 4-20 microns. In certain other embodiments, the stand-offs 120, 122, 124, and 126 may be fabricated by an additive process, such as vacuum deposition. The stand-offs 120, 122, 124, and 126 may serve to maintain a minimum separation between the tongue 110 and the head 102, such minimum separation being determined by the height of the stand-offs.

The tongue 110 also includes a plurality of adhesive receptacles 150, 152, 154. Each of the plurality of adhesive receptacles 150, 152, 154 is disposed adjacent to a corresponding one of the plurality of stand-offs 120, 122, 124, and 126, and at least a portion of each of the plurality of adhesive receptacles 150, 152, 154 is disposed between the adhesive material 140 and the corresponding one of the plurality of stand-offs 120, 122, 124, and 126.

The plurality of adhesive receptacles 150, 152, 154 may include one or more holes through the tongue. Suitable through-holes may be created in the tongue by wet or dry etching (e.g. ion beam etching), and may also serve as a via for the transmission of light to accelerate the curing of the adhesive material 140, if the adhesive material 140 is sensitive to light (e.g. ultraviolet light). Alternatively, etching can be terminated before the holes pass completely through the tongue, so that the plurality of adhesive receptacles 150, 152, 154 comprises partially-etched depressions (that do not serve as light vias). In certain embodiments, the partially-etched depressions preferably have a depth in the range of 10 microns to 25 microns to adequately accommodate adhesive material displacement and/or overflow. The plurality of adhesive receptacles 150, 152, 154 may also be fabricated by use of a forming die or a stamping die. In such embodiments, the plurality of adhesive receptacles 150, 152, 154 may comprise formed depressions that optionally have a depth in the range of 10 microns to 25 microns. Alternatively in such embodiments, the plurality of adhesive receptacles 150, 152, 154 may comprise stamped holes that pass completely through the tongue.

In certain embodiments, at least one of the discrete standoffs is circular in shape to enhance the utility of the standoff as an alignment feature during HGA assembly. For example, in the embodiment of FIGS. 1-2, the discrete standoffs 120, 122 are optionally circular in shape.

Figure 3:
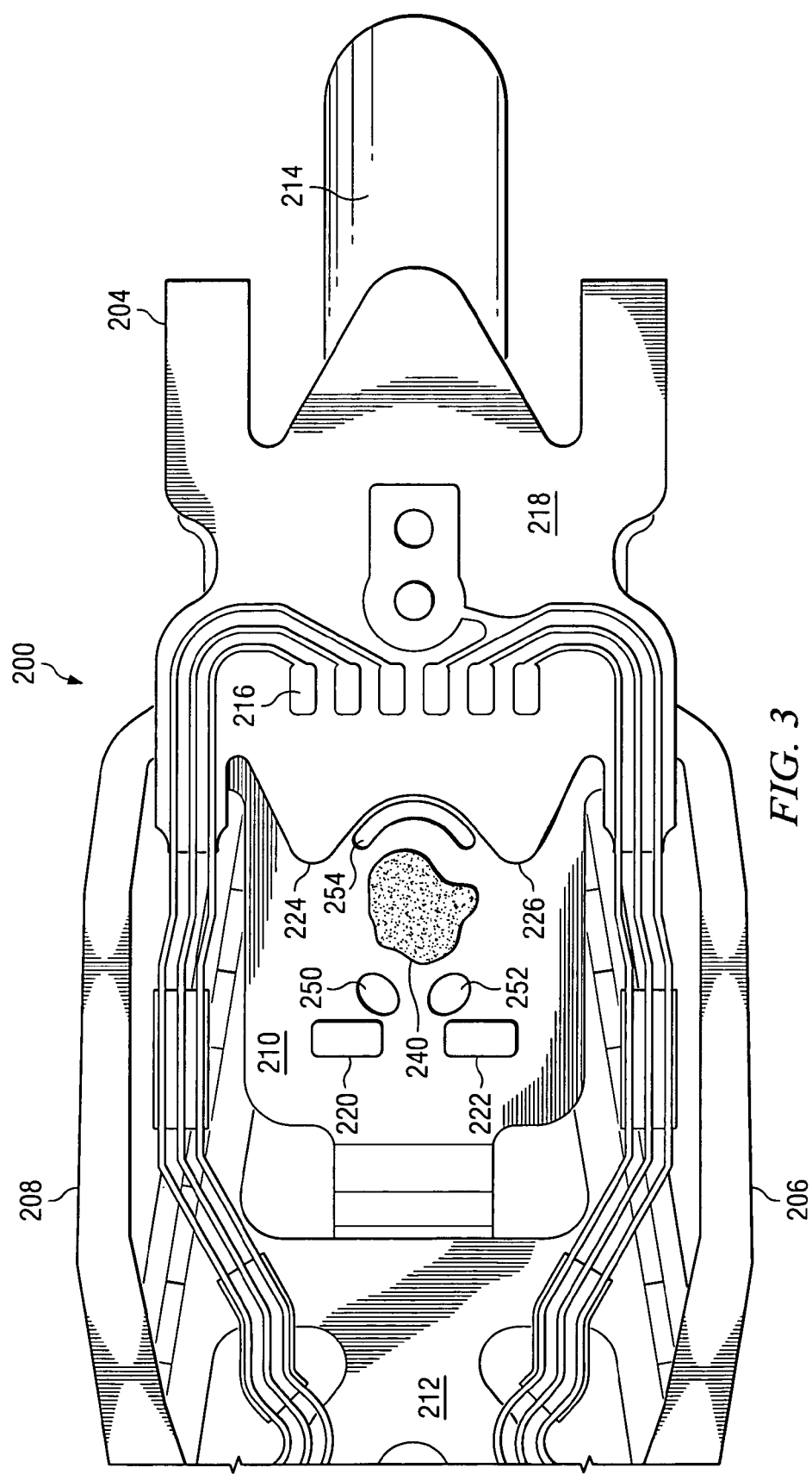
FIG. 3 depicts a HGA according to another embodiment of the present invention.

FIG. 3 depicts an HGA 200 according to another exemplary embodiment of the present invention. HGA 200 includes a load beam 212 that provides lateral stiffness and a vertical preload to the structure of HGA 200. The load beam 212 may be fabricated from stainless steel and may include a lift tab 214.

HGA 200 also includes a flexure 204. The flexure 204 includes a tongue 210 and two outrigger beams 206, 208 that provide flexibility to allow the tongue 210 to pitch and roll without excessive associated torques. The tongue 210, and the outrigger beams 206 and 208, may be fabricated from a stainless steel layer of the flexure 204.

The flexure 204 also includes electrically conductive traces 216 that may be fabricated from a conductive layer of the flexure 204 via a subtractive process such as etching. Alternatively, the electrically conductive traces 216 may be fabricated via an additive process such as deposition of a conductive layer onto the flexure 204. The conductive layer may comprise copper, for example.

HGA 200 also includes an adhesive material 240 that bonds the slider 134 to the tongue 210. The adhesive material 240 may comprise an epoxy material and may include a conductivity-enhancing dopant such as a silver dopant. Alternatively, the adhesive material 240 may comprise a cyanoacrylate material, for example. Curing of the adhesive material may be initiated or accelerated by ultraviolet light, in which case the adhesive material may be considered sensitive to ultraviolet light before it is completely cured.

In the embodiment of FIG. 3, the tongue 210 includes a plurality of discrete stand-offs 220, 222 adjacent the leading end 130 of the slider, and a plurality of stand-off regions 224, 226 of a dielectric layer 218, adjacent the trailing end 132 of the slider. The stand-offs 220, 222, 224, and 226 are in contact with the slider 134 after the slider bonding process is complete. Although two discrete stand-offs and two stand-off regions are shown in FIG. 3, other stand-off arrangements are contemplated and may be used. For example, stand-off regions 224, 226 may be replaced by additional discrete stand-offs, or a single discrete stand-off or stand-off region, and/or discrete stand-offs 220, 222 may be replaced by one or more discrete stand-offs or stand-off regions.

In certain embodiments, the stand-offs 220, 222, 224, and 226 are fabricated via a subtractive process from dielectric and conductive layers of the flexure 204. For example, the stand-offs 220, 222, 224, and 226 may be fabricated from a dielectric polyimide layer 218 of flexure 204, or may include material from both a polyimide layer and a copper layer. In such embodiments, the height of the stand-offs 220, 222, 224, and 226 would be determined by the thicknesses of the corresponding layers of flexure 204. For example, the flexure 204 may employ a dielectric layer thickness in the range 4-15 microns, and may employ a conductive layer thickness in the range 4-20 microns. In certain other embodiments, the stand-offs 220, 222, 224, and 226 may be fabricated by an additive process, such as vacuum deposition. The stand-offs 220, 222, 224, and 226 may serve to maintain a minimum separation between the tongue 210 and the head 102, such minimum separation being determined by the height of the stand-offs.

The tongue 210 also includes a plurality of adhesive receptacles 250, 252, 254. Each of the plurality of adhesive receptacles 250, 252, 254 is disposed adjacent to a corresponding one of the plurality of stand-offs 220, 222, 224, and 226, and at least a portion of each of the plurality of adhesive receptacles 250, 252, 254 is disposed between the adhesive material 240 and the corresponding one of the plurality of stand-offs 220, 222, 224, and 226.

The plurality of adhesive receptacles 250, 252, 254 may include one or more holes through the tongue. Suitable through-holes may be created in the tongue by wet or dry etching (e.g. ion beam etching), and may also serve as a via for the transmission of light to accelerate the curing of the adhesive material 240, if the adhesive material 240 is sensitive to light (e.g. ultraviolet light). Alternatively, etching can be terminated before the holes pass completely through the tongue, so that the plurality of adhesive receptacles 250, 252, 254 comprises partially-etched depressions (that do not serve as light vias). In certain embodiments, the partially-etched depressions preferably have a depth in the range of 10 microns to 25 microns to adequately accommodate adhesive material displacement and/or overflow. The plurality of adhesive receptacles 250, 252, 254 may also be fabricated by use of a forming die or a stamping die. In such embodiments, the plurality of adhesive receptacles 250, 252, 254 may comprise formed depressions that optionally have a depth in the range of 10 microns to 25 microns. Alternatively in such embodiments, the plurality of adhesive receptacles 250, 252, 254 may comprise stamped holes that pass completely through the tongue.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

I claim:

1. A head-gimbal assembly (HGA) comprising:
a slider;
a flexure, the flexure including a tongue; and
an adhesive material that bonds the slider to the tongue, the adhesive material including all adhesive that bonds the slider to the tongue;
wherein the tongue includes a plurality of stand-offs that contact the slider and a plurality of adhesive receptacles, each of the plurality of adhesive receptacles being disposed adjacent to a corresponding one of the plurality of stand-offs, and at least a portion of each of the plurality of adhesive receptacles being disposed between the corresponding one of the plurality of stand-offs and an extent of the adhesive material that is nearest to the corresponding one of the plurality of stand-offs; and
wherein the plurality of adhesive receptacles includes at least one formed depression in the tongue.

2. A head-gimbal assembly (HGA) comprising:
a slider;
a flexure, the flexure including a tongue; and
an adhesive material that bonds the slider to the tongue, the adhesive material including all adhesive that bonds the slider to the tongue;
wherein the tongue includes a plurality of stand-offs that contact the slider and a plurality of adhesive receptacles, each of the plurality of adhesive receptacles being disposed adjacent to a corresponding one of the plurality of stand-offs, and at least a portion of each of the plurality of adhesive receptacles being disposed between the corresponding one of the plurality of stand-offs and an extent of the adhesive material that is nearest to the corresponding one of the plurality of stand-offs; and
wherein the plurality of adhesive receptacles includes at least one partially-etched depression in the tongue.

3. The HGA of claim 2 wherein the at least one partially-etched depression has a depth between 10 microns and 25 microns.

4. The HGA of claim 2 wherein the adhesive material comprises a material that is sensitive to ultraviolet light before it is cured.

5. The HGA of claim 2 wherein the adhesive material comprises a material selected from the group consisting of an epoxy material and a cyanoacrylate material.

6. The HGA of claim 2 wherein the plurality of stand-offs includes a dielectric material.

7. The HGA of claim 6 wherein the dielectric material comprises polyimide.

8. The HGA of claim 2 wherein each of the plurality of stand-offs comprises a dielectric layer and a conductive layer.

9. The HGA of claim 8 wherein the conductive layer comprises copper.

10. The HGA of claim 8 wherein the dielectric layer has a thickness in the range 4 microns to 15 microns.

11. The HGA of claim 8 wherein the conductive layer has a thickness in the range 4 microns to 20 microns.

12. The HGA of claim 2 wherein each of the plurality of stand-offs has a height in the range 4 microns to 35 microns.

13. The HGA of claim 2 wherein the slider is not bonded to the tongue at the plurality of adhesive receptacles.

\* \* \* \* \*